United States Patent [19]

Lund

[11] 4,417,835

[45] Nov. 29, 1983

[54] APPARATUS FOR FORMING SHAPED EDGES

[75] Inventor: Wesley C. Lund, Seattle, Wash.

[73] Assignee: The Boeing Company, Seattle, Wash.

[21] Appl. No.: 216,534

[22] Filed: Dec. 15, 1980

[51] Int. Cl.³ .............................................. B23C 1/20
[52] U.S. Cl. ................................ 409/180; 144/117 B; 409/184
[58] Field of Search ............... 409/180, 197, 178, 175, 409/179, 181; 144/13.4, 134 A, 136 C, 136 R, 134 D, 136 D, 251 A, 253 R, 287, 144, 135 R, 117, 218, 134 R, 220; 145/5, 4, 8, 20; 51/170; 30/273, 276, 292, 289; 83/418, 430

[56] References Cited

U.S. PATENT DOCUMENTS

| | | | |
|---|---|---|---|
| 2,837,973 | 6/1958 | Dunlap | 409/180 |
| 3,280,663 | 10/1966 | Ames | 30/292 |
| 3,789,731 | 2/1974 | Loy | 144/117 B |
| 4,067,370 | 1/1978 | Chang | 144/117 R |

Primary Examiner—William R. Briggs
Assistant Examiner—Thomas M. Kline
Attorney, Agent, or Firm—Hughes, Barnard & Cassidy

[57] ABSTRACT

Apparatus, especially portable apparatus, for forming shaped edge profiles on the edges of sheet material wherein the sheet material is characterized by thickness non-uniformities; yet, wherein the root face thickness—i.e., that portion of the shaped sheet edge thickness from which no material is removed—of the shaped edge formed is maintained constant irrespective of thickness non-uniformities inherently present in such sheets. More specifically, apparatus which is particularly, but not exclusively, advantageous in preparing the edges of sheet material (such, for example, as sheet aluminum) for subsequent welding operations by routing or the like, where it is critical that the root face thickness of the shaped edge remain of constant thickness irrespective of thickness variations inherently present in the sheet material itself. In one of its principal aspects, the invention relates to portable routers which permit even unskilled operators to easily and quickly form shaped edges on sheets of material on a consistently reproducible basis, yet wherein the shaped edges thus formed are characterized by a continuously presented constant root face thickness which does not vary irrespective of changes in the thickness from point-to-point on a given sheet or thickness changes from sheet-to-sheet.

5 Claims, 6 Drawing Figures

APPARATUS FOR FORMING SHAPED EDGES

The Government has rights in this invention pursuant to Contract No. ALCM-N00019-78-C-0195 awarded by the U.S. Navy.

BACKGROUND OF THE INVENTION

The present invention relates generally to equipment—especially, portable routers and the like—for forming shaped edge profiles on sheets of material such, for example, as the edges of aluminum sheets, in those regions where two of such sheets are intended to be abutted and welded together; yet, for insuring that the root face thickness of the shaped sheet edge—i.e., that portion of the shaped edge from which no material is removed—remains of constant thickness irrespective of thickness variations within any given sheet and/or from sheet-to-sheet, and wherein such improved shaped edge profiles can be quickly and easily formed even by unskilled operators on a consistently reproducible basis.

In the formation of many types of fabricated products such, merely by way of example, as aircraft, missiles, ships, tanks, vehicles, containers, etc., it is often necessary to abut two sheets of material in edge-to-edge relation and to weld such sheets together, preferably forming a welded seam which, in cross-section, is of essentially the same thickness as the sheet material itself. To accomplish this, it has been a common practice to pre-shape the sheet edges by, for example, routing. Unfortunately, however, prior to the advent of the present invention, this has commonly involved the use of routers or other portable edge preparation machines which index to the side or face of the sheet from which the material is being removed—i.e., the sheet face closest to the welder. Since the thickness of such sheets will inherently vary (both within a given sheet and from sheet-to-sheet), the result has been that the root face thickness of the thus shaped edges also vary. Stated differently, because the routing tool is indexed from the sheet face from which material is to be removed, the routed channel thus formed will have a constant depth and, since the thickness of the base metal sheet varies, the root face thickness at the shaped edge must also vary. This has inherently resulted in significant problems when attempting to weld such sheets together since the root face thicknesses of the two abutting edges are not constant and identical.

Typical examples of prior art approaches to routing processes and equipment, especially for edge preparation of sheet materials, are those disclosed in, for example, the following U.S. Pat. Nos. 3,853,160—Posey; 4,024,898—Bergler et al; 3,893,372—Strakeljahn; 3,212,541—Burrows et al; 2,935,102—Potter; 2,839,107—Emmons; and, 2,672,898—Schuster. For example, in the aforesaid Posey U.S. Pat. No. 3,853,160, the patentee is concerned with forming a step or ledge in a workpiece edge; and, as in the other patents noted above, provides a router or similar edge preparation machine which is indexed from the edge or face of the workpiece from which material is being removed. As a consequence, any variations in thickness of the workpiece are replicated in the root face thickness since the step 16 remains of uniform depth with respect to the surface 26 from which the routing tool is indexed. See, e.g., Posey U.S. Pat. No. 3,853,160, Col. 2, 11. 51-57.

SUMMARY OF THE INVENTION

Accordingly, it is a general aim of the present invention to provide improved apparatus for forming shaped edges in sheet material and characterized by its compactness, portability and ease of operation on a consistently reproducible basis; and, wherein the root face thickness of the shaped edge produced remains constant irrespective of sheet thickness variations in either or both of individual sheets and/or successive sheets.

In one of its more detailed aspects, it is an object of the present invention to provide an improved power-driven, manually-operated, portable edge preparation machine such, for example, as a router, wherein the equipment is indexed from that face of the sheet material which is remote from the face undergoing material removal so as to insure attainment and maintenance of a constant root face thickness irrespective of variations in thickness of the sheet material itself.

A further and more detailed objective of the invention is the provision of an improved, light-weight, portable router which permits of ease of accurate engagement of the router with the sheet material being worked upon, and which consistently functions to form a routed edge characterized by a root face thickness of constant dimension for any given setting of the equipment irrespective of the thickness of the sheet material per se; and, wherein operators are able to safely, consistently and reproducibly form such routed sheet edges having essentially identical, uniform, constant root face thicknesses irrespective of thickness variations within a given sheet of material and/or from sheet-to-sheet without requiring any significant degree of training and expertise in the usage of such tools.

A further and more detailed objective of the invention is the provision of a portable routing device of the foregoing character which can be readily adjusted to control the thickness of the root face thickness of the shaped edge on the sheet material, and which readily permits of use with a wide range of different thicknesses of sheet material.

A further objective of the invention is the provision of a portable routing tool which permits attainment of the foregoing objectives irrespective of the shape of the material removing cutting blade on the tool and irrespective of the orientation of the tool axis with respect to the plane of the sheet being worked on.

DESCRIPTION OF THE DRAWINGS

These and other objects and advantages of the present invention will become more readily apparent upon reading the following detailed description and upon reference to the attached drawings in which.

Figure 1:
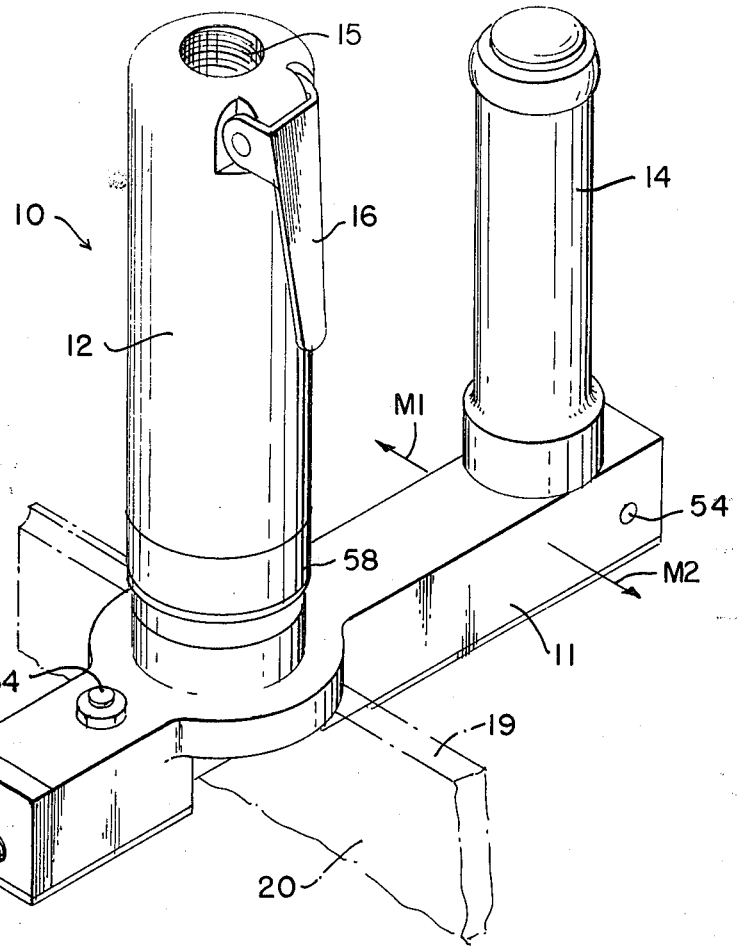
FIG. 1 is a perspective view of an exemplary edge preparation machine—here, a portable router—embodying the features of the present invention, with the exemplary device here being shown as operating on an exposed edge of a piece of sheet material shown in phantom.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Figure 3:
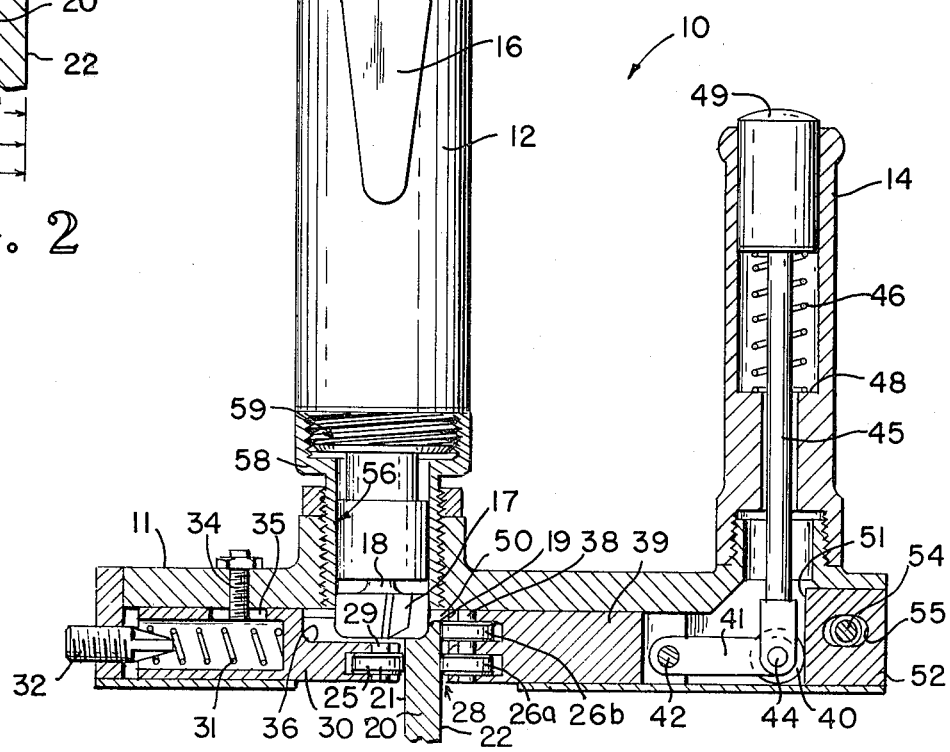
FIG. 3 is a vertical sectional view, partly in elevation, here illustrating the relationship of the sheet material workpiece to the shaping tool during a routing operation.

Referring now to the drawings, and particularly to FIGS. 1 and 3 conjointly, there has been illustrated an exemplary portable edge preparation machine embodying the features of the present invention which here takes the form of a router, generally indicated at 10. As here shown, the portable router 10 includes a generally horizontal base member 11 having a pair of spaced, upwardly extending, integral handles 12 and 14. Those skilled in the art will, of course, appreciate that terminology such as "horizontal," "upward," "left," "right," etc., is used herein simply to facilitate an understanding of the invention and not by way of limitation. In the illustrative form of the invention, handle 12 comprises the outer casing or housing of a suitable motor (not shown) which may be powered in any conventional fashion such, for example, as by an air compressor (not shown) or by other fluid medium, or by electric power. To permit the motor to be coupled to a suitable source of motive power, the motor housing or handle 12 is preferably provided with a threaded opening 15 to permit attachment of the desired motive power fittings. Additionally, the motor casing or handle 12 of the tool 10 is further provided with a conventional ON/OFF switch or trigger 16 by which power can be selectively transmitted to, and/or disconnected from, any suitably shaped power driven shaping tool such, for example, as the cutting tool generally indicated at 17 in FIG. 3 mounted on the outboard end of the router's driven shaft 18. In operation, the portable tool 10 is adapted to be mounted astraddle one edge 19 of a sheet-like workpiece 20 with freedom for relative movement with respect to the workpiece edge 19 in one or the other of the directions indicated by arrows $M_1$ and $M_2$ (FIG. 1).

Figure 2:
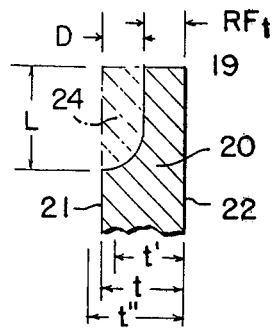
FIG. 2 is a fragmentary sectional view through a piece of sheet metal here depicted as having had one edge thereof (the upper edge as viewed in the figure) shaped in accordance with the present invention by material removal so as to leave a shaped edge having a fixed, constant, root face thickness.

Referring more particularly to FIG. 2, it will be noted that a typical sheet-like workpiece 20 will generally have a thickness t and a pair of parallel opposed faces 21, 22. A typical edge preparation tool such, for example, as the router 10 of the present invention or a conventional prior art device would, in the environment in which the present invention finds particularly advantageous use, be intended to remove that portion of the workpiece surface 21 and exposed edge 19 indicated in phantom at 24. Consequently, if, as in the prior art, the particular material removing tool (not shown in FIG. 2) is indexed from the face 21 of the workpiece 20 from which material is to be removed, it will be appreciated that the depth of the cut D will be constant and will be determined by the degree of penetration of the cutting tool into the workpiece as permitted by the indexing mechanism. The remaining portion of the exposed edge 19 from which no material is removed defines the root face thickness $RF_t$. Since the depth of the cut D will, under such a prior art arrangement, be fixed and constant, the root face thickness $RF_t$ will vary dependent upon the thickness t of the workpiece 20. For example, if the workpiece 20 includes a region of reduced thickness t', the root face thickness $RF_t$ will be less; and, if the workpiece 20 includes an area of increased thickness t'', the root face thickness $RF_t$ will be increased. The present invention is concerned with tools characterized by their simplicity, compactness and ease of operation, yet which are capable of consistently and reproducibly removing regions of material such as indicated at 24 in FIG. 2 while leaving a shaped edge 19 having a constant root face thickness $RF_t$ which does not vary with changes in the thickness t of the workpiece.

In accordance with one of the important aspects of the present invention, provision is made for permitting continuous removal of a portion of a sheet-like workpiece edge—e.g., the portion of edge 19 indicated at 24 in FIG. 2—while insuring that the root face thickness $RF_t$ of the thus shaped edge 19 remains constant despite variations in thickness which are inherent in the sheet material workpiece 20. To accomplish this, and referring first to FIG. 4, the exemplary router 10 is here shown immediately following engagement of the tool 10 and the workpiece 20—i.e., with the router 10 astraddle the workpiece edge 20—but prior to relative positioning of the router's material removing tool 17 and the workpiece 20 to effect material removal. Thus, the illustrative router 10 is here provided with a plurality of spring-loaded pressure rolls 25, 26a and 26b which define an adjustable width workpiece-receiving-notch, generally indicated at 28, formed in the lower surface of the base member 11. The arrangement is such that the pressure rolls 25, 26a and 26b serve to clamp the workpiece 20 into position within the notch during operation of the router.

Figure 4:
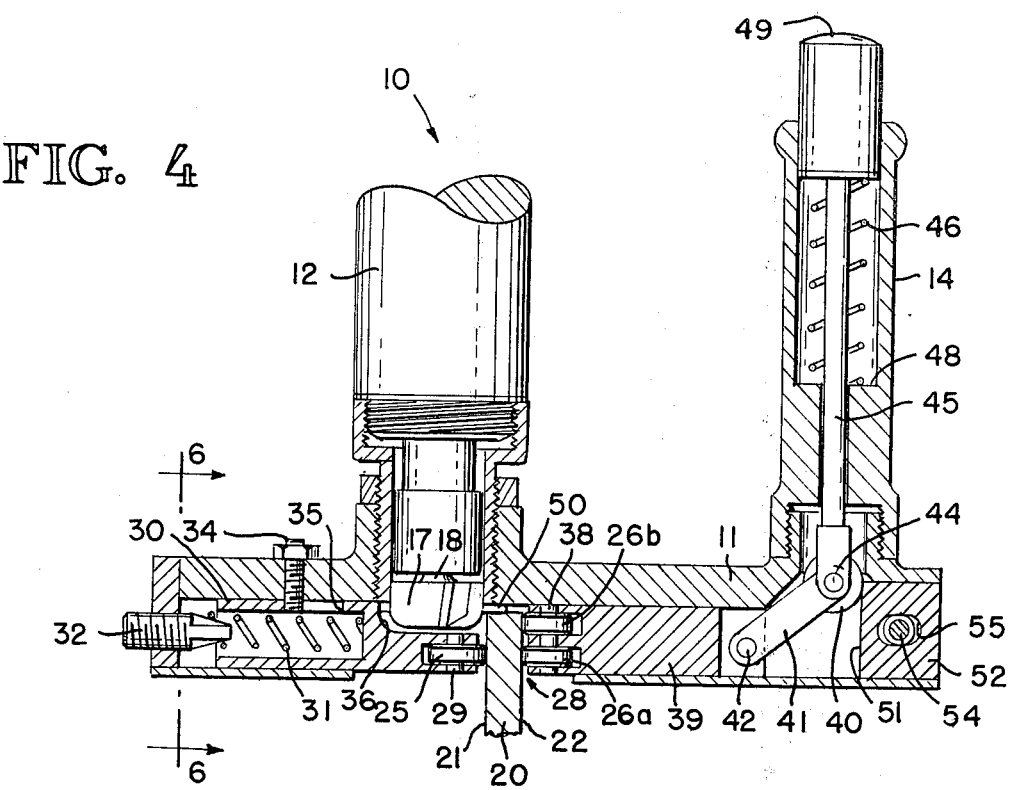
FIG. 4 is a vertical sectional view, partly in elevation, and similar to FIG. 3, but here illustrating the relationship of the tool components and the sheet material workpiece after engagement of the tool and the workpiece, but prior to movement of the workpiece edge into material removal relation with the cutting element of the tool.

In carrying out this aspect of the invention, pressure roll 25 is mounted on a stub shaft 29 journalled for rotation in a bifurcated roll supporting slide 30 which is mounted within the base member 11 with freedom for reciprocating motion towards and away from the workpiece 20. As here shown, slide 30 is preferably spring biased towards the workpiece—i.e., to the right as viewed in the drawing—by means of a suitable compression spring 31, with the degree of biasing force being adjustable dependent upon the axial position of an adjusting screw 32 or the like. Movement of the slide 30 and pressure roll 25 to the right as viewed in the drawing is limited by means of a stop element 34 extending through base member 11 and received within a keyway 35 formed in the upper surface of slide 30. Thus, in the neutral or non-cutting position of the router 10 as shown in FIG. 4, slide 30 is urged to the right to force pressure roll 25 into engagement with the face 21 of workpiece 20. The uppermost right hand surface of slide 30 as viewed in the drawings in relieved, as indicated at 36, so as to accommodate the material removing element or blades on the power driven shaping tool 17.

In order to permit ease of insertion of workpiece 20 into notch 28, the pressure rolls 26a, 26b, which are preferably mounted on a stub shaft 38 journalled for rotation in a slide 39 carried by base member 11 with freedom for controlled reciprocating movement towards and away from the workpiece 20, are normally biased to the right as viewed in the drawings during a non-cutting operational mode when the router 10 is being positioned astraddle the workpiece 20 and its edge 19. To this end, slide 39 is coupled to a cam roller 40 by means of a linkage assembly 41 pivoted at one end 42 to the slide 39 and at its opposite end 44 to cam roller 40. Cam roller 40 is carried by a cam actuator 45 which is vertically reciprocable in handle 14 and which is normally biased upwardly (as viewed in the drawings) by means of a compression spring 46 bottomed at its inboard end on a shoulder 48 formed in handle 14 and at its outboard end on a manually operable actuating knob 49 that projects outwardly through the upper end of handle 14. Thus, the arrangement is such that when the exemplary router 10 and workpiece 20 are being positioned with respect to one another prior to an edge routing operation, spring 46 serves to bias the actuating knob 49 and the cam roller 40 in an upward direction, thereby shifting slide 39 and pressure rolls 26a, 26b carried thereby to the right and away from the face 22 of workpiece 20 so as to form the work-receiving-notch, generally indicated at 28, between the opposed faces of back-up pressure roll 25 and the coaxial pressure rolls 26a, 26b.

In operation, the operator simply positions the router 10 with notch 28 astraddle the workpiece 20 and its edge 19, with edge 19 being bottomed on a horizontally disposed guide surface 50 formed within the base member 11. At this point, the operator, who is holding router 10 in both hands (not shown) by means of handles 12 and 14, simply depresses actuating knob 49 with the extremities of one hand and ON/OFF switch 16 with the other hand. Depression of the ON/OFF switch 16 serves to transmit power to the material shaping tool 17 supported on the driven router shaft 18. Depression of actuating knob 49 serves to compress spring 46 and shift the cam roller 40 downwardly over a fixed, but adjustable, vertical cam surface 51 from the position shown in FIG. 4 to the position shown in FIG. 3. As the cam roller 40 begins to move downwardly, link 41 is caused to pivot (in a clockwise direction as viewed in FIG. 4) about pivot point 42, thereby forcing slide 39 to move to the left as viewed in the drawing. Such lateral or sidewise movement of the slide 39 causes the pressure rolls 26a, 26b to sequentially: (i) engage the face 22 of workpiece 20 so as to first clamp the workpiece 20 between the pressure rolls 26a, 26b and the spring loaded back-up pressure roll 25; and (ii) to thereafter shift the workpiece 20 laterally to the left relative to the shaping tool 17 (as viewed in FIG. 4) so as to move the face 21 and edge 19 of the workpiece into material removing engagement with the shaping tool 17 mounted on the driven shaft 18 of router 10, as best illustrated in FIG. 3. During such relative sidewise movement of the workpiece 20 under the influence of cam roller 40 and linkage assembly 41, slide 30 is simultaneously shifted laterally against the biasing force provided by compression spring 31, thus securely clamping the workpiece 20 between pressure roll 25 and coaxial pressure rolls 26a, 26b.

Those skilled in the art will appreciate from the foregoing description that the extent of relative lateral movement of the workpiece 20 towards and into the path of the driven material removing means 17 is determinative of the depth D (FIG. 2) of the material removed by the router 10. Since the workpiece 20 is moved laterally relative to tool 17 by means of pressure applied by pressure rolls 26a, 26b which are, in turn, shifted to the left by the positive linkage defined by slide 39, linkage assembly 41, cam roller 40, and the fixed cam surface 51, it will be apparent that for any given setting of the cam surface 51, the distance between the face 22 of work-piece 20 and the material removing surfaces of shaping tool 17 will remain constant irrespective of thickness variations in the workpiece. That is, thickness variations in the workpiece 20 will be accommodated by lateral movement of the spring loaded back-up pressure roll 25. Therefore, as the thickness of the workpiece 20 increases from t to t'' (FIG. 2), the roll 25 will shift slightly to the left (as viewed in FIG. 3) against the biasing force provided by spring 31 and more material will be removed from the work-piece 20 by the material removing shaping tool 17—i.e., D will increase—and, as the thickness decreases to t' (FIG. 2), the roll 25 will shift slightly to the right (as viewed in FIG. 3) under the bias provided by spring 31, and less material will be removed—i.e., D will decrease.

Figure 5:
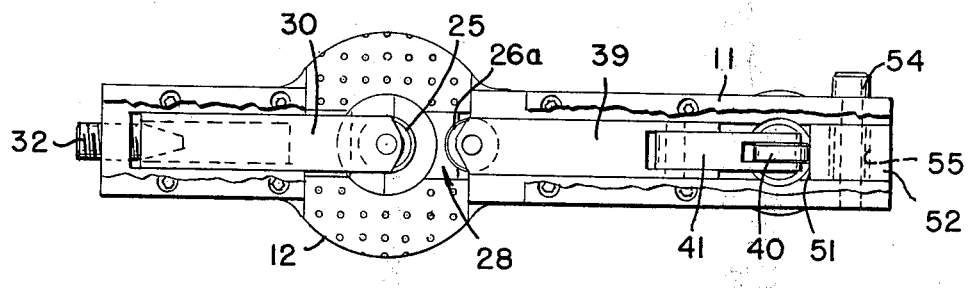
FIG. 5 is a bottom view of the exemplary router shown in FIGS. 3 and 4.
Figure 6:
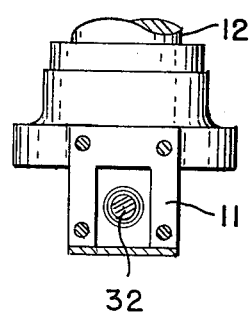
FIG. 6 is a fragmentary end view, partly in section, taken substantially along the line 6—6 in FIG. 4.

But, in either case, since face 22 of workpiece 20 remains fixed relative to the material removing tool 17 as a result of the non-yielding linkage defined by slide 39, link 41, cam roller 40, and cam surface 51, the root face thickness $RF_t$ remains constant. To permit adjustment of the root face thickness $RF_t$, fixed cam surface 51 is preferably defined by the leading edge of a slide-type stop element 52 which is adjustably secured to base member 11 by means of a threaded fastener 54 (FIGS. 4 and 5) which extends through an elongated slot 55 formed in stop element 52 and is threadably secured to the base member. Thus, when adjusting the router 10 to provide any given root face thickness $RF_t$, the fastener 54 is loosened and the stop element 52 is moved laterally (as viewed in FIG. 4) to the desired position. Threaded fastener 54 is then tightened to securely clamp stop element 52 between the opposite sides of the base member 11. The arrangement is such that movement of the cam surface 51 to the left as viewed in the drawings serves to increase the depth D (FIG. 2) of the material removed from the workpiece 20 and, at the same time, to decrease the root face thickness $RF_t$. Conversely, lateral adjustment of the cam surface 51 to the right as viewed in the drawings serves to decrease the depth D of material removal and, at the same time, to increase the root face thickness $RF_t$.

Referring again to FIGS. 1 and 3 conjointly, it will be appreciated that when the operator is holding router 10 by handles 12 and 14 with the ON/OFF switch 16 and actuating knob 49 depressed, it is merely necessary to move the router 10 along the edge 19 of workpiece 20 in the direction of one or the other of the arrows $M_1$ or $M_2$ so as to shape the edge 19 throughout the entire portion of the edge where shaping is required. As the tool 10 and workpiece 20 move relative to one another, thickness variations in the sheet material workpiece 20 are accommodated in the manner hereinabove described—i.e., by virtue of the fact that surface 22 of workpiece 20 remains fixed relative to the material removing tool 17, while spring loaded back-up roller 25 shifts to compensate for such thickness variations.

Upon completion of a routing operation, the operator merely releases the ON/OFF switch 16 and the actuating knob 49, thus shutting power to the shaping tool 17 OFF and permitting compression spring 46 (FIGS. 3 and 4) to urge the actuating knob 49 upwardly as viewed in the drawings. As the actuating knob 49 and cam actuator 45 move upwardly, link 41 pivots in a counter-clockwise direction as viewed in the drawings about pivot point 42 from the position shown in FIG. 3 to the position shown in FIG. 4, thereby causing slide 39 to shift from its extreme leftward material removing position as shown in FIG. 3 to a retracted position as shown in FIG. 4. As slide 39 moves to the right, slide 30 also moves to the right under the influence of compression spring 31, thereby relatively shifting the workpiece 20 to the right and away from the material shaping tool 17. Movement of slide 30 to the right is limited by stop 34 and, at this point the clamping pressure on the workpiece 20 theretofore provided by pressure rolls 26a, 26b and back-up roll 25 is released, permitting the router 10 to be disengaged from the workpiece 20.

Referring to FIGS. 2 and 3 conjointly, it will be appreciated that the length L of material removed in the region 24 from workpiece 20 will be determined by the extent of axial penetration of tool 17 into the workpiece 20 along a plane parallel to the face 21 of the workpiece. With the present invention, this dimensional parameter can be readily adjusted and controlled by virtue of the threaded connection, generally indicated at 56, provided between the base member 11 and a sleeve 58 removably secured to the base member. A fixed threaded connection, generally indicated at 59, is provided between the motor housing or handle 12, and sleeve 58.

Those skilled in the art will appreciate from the foregoing description that there has herein been disclosed an exemplary routing tool which permits of simple and effective shaping of the edges of sheet material in such a manner that the root face thickness $RF_t$ of the shaped edge remains constant irrespective of thickness variations in the workpiece(s). Moreover, the provision of a routing tool having two separate handles which must be grasped and held by the operator throughout the routing operation serves to not only increase the stability of the portable routing tool in operation but, moreover, significantly enhances the safety factor when using such a tool.

Of course, those skilled in the art will appreciate that various modifications can be made to the exemplary routing tool 10 without departing from the spirit and scope of the invention as expressed in the appended claims. For example, although the exemplary tool 10 has been illustrated as included a manually actuated pressure roll slide 39, those skilled in the art will appreciate that the slide 39 could be shifted between the inoperative position shown in FIG. 4 and the operative position shown in FIG. 3 in various other ways such, for example, as by the use of a double acting fluid piston/cylinder combination, solenoids or the like. In this connection, it will be understood that the present invention has herein been described in connection with "relative" movement between the workpiece 20 and the material removing tool 17 upon reciprocation of slide 39 relative to base member 11—e.g., in some instances the workpiece may be fixed in space and, consequently, actuation of the slide 39 will actually cause the tool 17 to move towards the workpiece; whereas in other instances the workpiece may be free to move and, consequently, actuation of the slide 39 can result in movement by either or both of tool 17 and the workpiece 20. Moreover, although the exemplary apparatus has been illustrated with the router's driven shaft 18 oriented perpendicular to the guide surface 50, it need not be oriented in that particular position but, rather, it can define an included angle between shaft 18 and guide surface 50 of other than 90°. Further, those skilled in the art will appreciate that, if desired, one or more of the pressure rolls 25, 26a and/or 26b could be power driven to facilitate lateral translation of the router 10 relative to and along the edge of the workpiece 20. And, of course, while the invention has herein been described and illustrated in connection with an exemplary "portable" router 10, the router need not be "portable" but can constitute a fixed shaping tool through which material to be shaped is passed.

What is claimed is:

1. A portable router comprising, in combination, a base member defining a horizontally oriented guide surface, a power driven routing tool fixedly mounted on said base member, said routing tool having a material removing blade extending below the plane of said guide surface, first back-up pressure roll means mounted on said base member with freedom for reciprocating sliding motion beneath said guide surface and said material removing blade, a fixed stop mounted on said base member and positioned to be engageable with said back-up pressure roll means, first biasing means for normally biasing said back-up pressure roll means into engagement with said fixed stop, second pressure roll means mounted on said base member with freedom for reciprocating sliding motion beneath said base member, second biasing means for normally biasing said second pressure roll means in a direction away from said first back-up roll means so as to form a sheet workpiece receiving notch in said router beneath said guide surface, and operator controlled actuating means for overcoming said second biasing means for shifting said second pressure roll means towards said first back-up pressure roll means to clamp a sheet-like workpiece between said first and second pressure roll means with an edge of the sheet-like workpiece engaged with said guide surface, and for thereafter relatively shifting said first and second pressure roll means and the sheet-like workpiece clamped therebetween laterally through a fixed predetermined distance so as to relatively move the face of the workpiece engaged with said first back-up pressure roll means and the sheet edge engaged with said guide surface into material removing engagement with said material removing blade whereby relative movement of said router along and with respect to the edge of the workpiece engaged with said guide surface serves to remove material from the face and edge of the work piece in material removing engagement with said blade while maintaining a constant root face thickness at the thus formed shaped edge of the workpiece irrespective of variations in thickness of the workpiece.

2. A portable router as set forth in claim 1 wherein said second pressure roll means are carried by a slide, and said operator controlled actuating means includes a cam roller engageable with a fixed cam surface, a link pivotally connected at one end to said slide and at its opposite end to said cam roller, and a manually shiftable cam actuator for causing said cam roller to traverse said cam surface and thereby shift said slide between a first fixed limit position where said second pressure roll means are fully retracted and at a maximum distance from said blade and a second fixed limit position where said second pressure roll means are at a fully advanced position and are closely spaced apart from said blade by a predetermined distance corresponding to the root face thickness of the shaped edge of the sheet-like workpiece.

3. A portable router as set forth in claim 1 wherein said first biasing means comprises a compression spring interposed between said base member and said first back-up pressure roll means.

4. A portable router as set forth in claim 2 or 3 wherein said second biasing means comprises a compression spring interposed between said base member and said operator controlled actuating means for normally biasing said slide towards said first fixed limit position.

5. A portable router as set forth in claim 2 including means for shifting said cam surface to a selected one of a plurality of fixed positions so as to permit controlled adjustment of said second fixed limit position.

* * * * *